United States Patent [19]
Pilat, Jr.

[11] Patent Number: 6,089,706
[45] Date of Patent: Jul. 18, 2000

[54] CUSTOM SUNGLASS CLIP ASSEMBLY

[76] Inventor: James F. Pilat, Jr., 309 W. 57th St., Apt. 606, New York, N.Y. 10019

[21] Appl. No.: 09/257,278

[22] Filed: Feb. 24, 1999

Related U.S. Application Data

[60] Provisional application No. 60/078,863, Mar. 20, 1998.

[51] Int. Cl.[7] .................................................. G02C 9/00
[52] U.S. Cl. .............................. 351/47; 351/57; 351/90; 351/178
[58] Field of Search ................................ 351/47, 57, 90, 351/98, 101, 178

[56] References Cited

U.S. PATENT DOCUMENTS

| | | | |
|---|---|---|---|
| 1,907,749 | 5/1933 | Dechau | 351/90 |
| 2,141,063 | 12/1938 | Euler | 351/47 |
| 2,254,637 | 9/1941 | Welsh | 351/47 |
| 2,492,072 | 12/1949 | Tapner | 351/41 |
| 4,380,379 | 4/1983 | Ahern et al. | 351/106 |
| 4,466,713 | 8/1984 | Tanaka | 351/106 |
| 5,423,712 | 6/1995 | Underwood et al. | 451/8 |
| 5,431,595 | 7/1995 | Underwood | 451/237 |
| 5,654,785 | 8/1997 | Shih et al. | 351/47 |
| 5,710,614 | 1/1998 | Cereda | 351/47 |
| 5,724,118 | 3/1998 | Krebs | 351/47 |
| 5,889,574 | 3/1999 | Gandl-Schiller | 351/47 |

*Primary Examiner*—Huy Mai
*Attorney, Agent, or Firm*—Gottlieb, Rackman & Reisman, P.C.

[57] ABSTRACT

A customized eyewear system sunglasses clip assembly is provided. The assembly includes a clip element comprising a tension bar having a first end and a second opposite end, as well as a pair of flexible eyewires each having a first end attached to the tension bar and a second end selectively feedable through and lockable by a screw locking unit fixed to the tension bar. Each eyewire is designed for wrapping around a sunglass lens. A pair of hook elements is also provided for use in maintaining the finished sunglass clip unit in an overlying position with respect to the wearer's prescription eyeglasses.

17 Claims, 3 Drawing Sheets

CUSTOM SUNGLASS CLIP ASSEMBLY

This application claims benefit of provisional application No. 60/078,863 filed Mar. 20, 1998.

BACKGROUND OF THE INVENTION

This invention relates to an optometric device, and more particularly, to a customized sunglasses clip unit specially sized to coordinate with a person's regular eyeglasses.

As is well known, millions of individuals wear sunglasses in order to improve their vision and comfort on bright sunny days. Sunglasses, of course, reduce glare and shade the eyes of the wearer. Sunglasses on the market have various designs and styles, which often-times can create a certain "look."

For those individuals who do not require corrective eyeglass lenses, a variety of low cost sunglasses may be purchased from various stores and retail chains. However, for those many individuals who are nearsighted, farsighted, or otherwise have poor vision, and therefore wear corrective eyeglasses on a routine basis, a separate pair of prescription sunglasses is required, which can be very expensive. This is especially so for those individuals whose prescriptions change on a frequent basis; those individuals not only must purchase a regular pair of eyeglasses each time, but must also purchase a separate pair of sunglasses each time.

Clip-on sunglasses are a low cost option to prescription sunglasses. In general, clip-on sunglasses are attached or otherwise "clipped" onto conventional prescription eyewear in order to convert the eyewear into sunglasses. Nonetheless, although clip-on sunglasses are much more cost effective than purchasing prescription sunglasses clip-on sunglasses are less than desirable, in part because they are normally manufactured in a limited number of designs, sizes and shapes which may or may not conform to the lens design of the eyeglasses worn by the individual.

Accordingly, it would be desirable to provide clip-on sunglasses which are customized in design in order to coordinate with a person's regular eyeglasses.

SUMMARY OF THE INVENTION

Generally speaking, in accordance with the invention, a customized sunglass clip assembly is provided. The assembly includes a clip element comprising a central tension bar having first and second opposite ends, as well as a pair of flexible eyewires each having a first end attached to one of the ends of the tension bar and a second free end selectively feedable through and lockable by a corresponding screw locking unit fixed to the tension bar. Each eyewire is designed for wrapping around a sunglass lens that is cut out to a desired shape and size. A pair of hook elements is also provided for use in maintaining the finished sunglass clip unit in an overlying position with respect to the wearer's prescription eyeglasses when the clip unit is worn.

In use, the optician first prepares or cuts a pair of sunglass lenses that are identical in size and shape to the lenses of the wearer's regular prescription eyeglasses. After first feeding the eyewire through one of the hook elements, each eyewire of the clip unit is wrapped around one of the cut out lenses by first feeding the eyewire through one of the hook elements. Then, the free end of the eyewire is fed through its corresponding screw locking assembly where it is grabbed by the screw thereof when it is turned—the end of the eyewire is slotted so that it can be grabbed by the threads of the screw.

In assembly, excess eyewire is cut off, typically prior to its engagement with the screw lock assembly. This is achieved by simply measuring the eyewire to see how much eyewire is needed to wrap around the sunglass lens and then cutting off what appears to be the excess.

Each hook element of the inventive assembly has a first hook member through which one of the eyewires of the clip unit runs and a second hook member which grabs or otherwise sits underneath the frame of the regular pair of the eyeglasses when the inventive clip assembly is placed thereover during use. Significantly, the first hook member of the assembly, which sits around the edge of the sunglass lens of the unit, is tightened around the lens edge as the eyewire is locked by the screw lock assembly.

Accordingly, it is an object of the invention to provide an improved customized sunglass clip assembly.

Another object of the invention is to provide an improved sunglass clip assembly which conforms to the size, share and design of the wearer's prescription eyeglasses.

Yet a further object of the invention is to provide a sunglass clip assembly which is inexpensive to manufacture and purchase, as well as user friendly.

Still another object of the invention is to provide an improved sunglass clip assembly which is fabricated using conventional tooling.

A further object of the invention is to simply provide an improved sunglass clip assembly which can be produced by an optician in a relatively short period of time.

Still other objects and advantages of the invention will in part be obvious, and in part be apparent from the following description.

The invention accordingly comprises the system and assembly possessing the features, properties and relation of elements which are exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENTS

Figure 1:
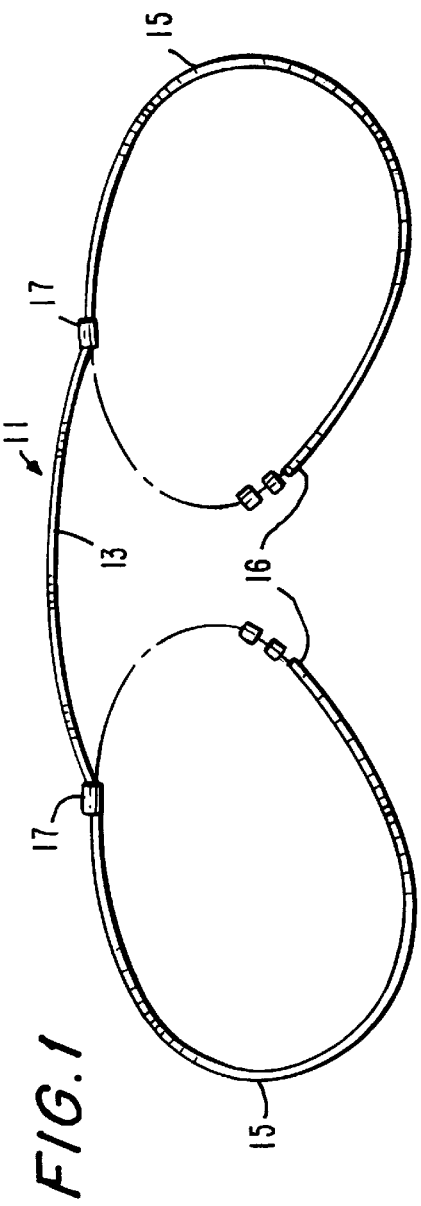
FIG. 1 is a front elevational view of an unfinished clip unit of the inventive sunglass clip assembly.

Referring first to FIG. 1, a clip element or unit generally indicated at 11 and used in making the customized sunglass clip assembly of the invention is shown. Clip element 11 includes a tension bar 13 made from a metal, metal alloy or metal composite composition and a pair of flexible and bendable eyewires 15 arcuately extending from either end of tension bar 13. Each of eyewires 15 is made from a metal, metal alloy or metal composite and is constructed to be extremely pliable so that it can easily wrap around a sunglass lens, as described below. Each eyewire has a free end 16 which, during assembly, is fed through a corresponding screw locking unit 17 located at either end of tension bar 13, as further described later on.

Figure 3:
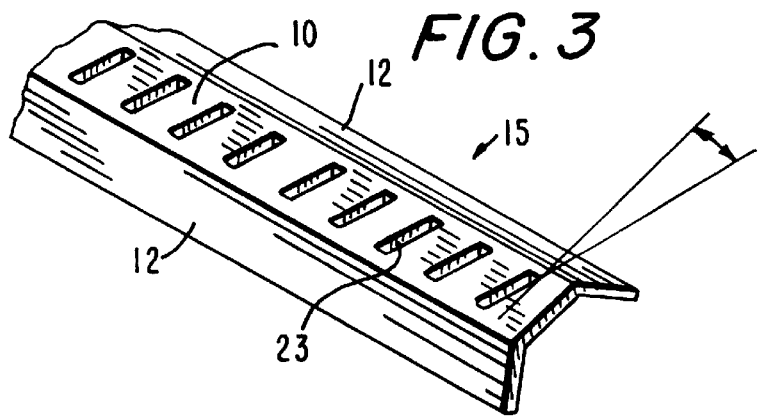
FIG. 3 is an enlarged perspective view of a portion of the eyewire that is used in the inventive sunglass clip assembly.
Figure 4:
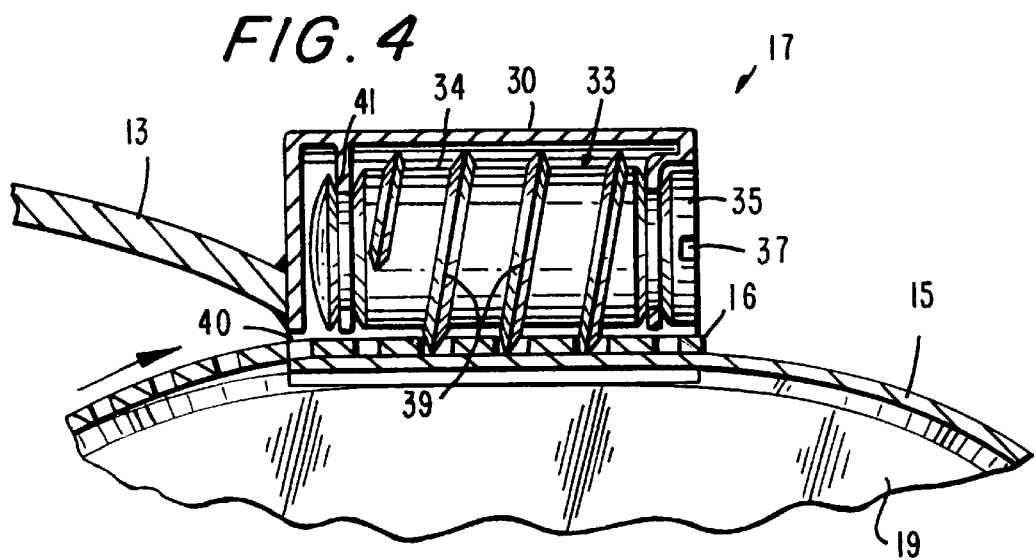
FIG. 4 is a cross-sectional view of the screw locking unit of the inventive sunglass clip assembly.

Referring now to FIG. 3, as well as to FIG. 4, each eyewire 15 is now better described. Eyewire 15 comprises a longitudinally extending main wall 10 and a pair of longitudinally extending sidewalls 12, which together are sized for wrapping about and otherwise grabbing the edge wall of a sunglass lens 19 (see FIG. 4) during production of the inventive sunglass clip assembly. Front wall 10 is formed with a plurality of running grooves 23 which are grabbed by the screw of locking unit 17 during final assembly of the inventive system (see FIG. 4 once again), as described later on.

Figure 6:
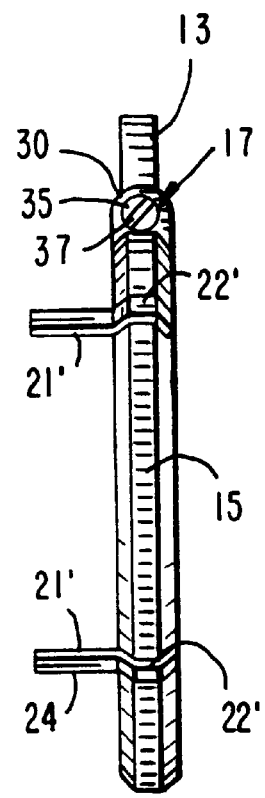
FIG. 6 is a side elevational view of the sunglass clip assembly.

Referring now in particular to FIG. 4, as well as FIG. 6, each of screw locking units 17 is now described in greater detail. Each of screw locking units 17 is fixed at one of the ends of tension bar 13 (see FIG. 1) and is defined by a tubular-shaped housing 30. Housing 30 is made of stainless steel, carbide, titanium, or some other high performance metal and contains a metal screw member generally indicated at 33 having a body 34 formed with a plurality of outer annular threads 39, and a head 35 at one end formed with single slot 37. Slot 37 is sized for receiving the end of a conventional screwdriver in order to selectively turn screw member 33 so as to lock eyewire 15 therewith, as described hereinafter.

Housing 30 of locking unit 17 is formed with a passage 40 running therethrough that is sized for selectively receiving free end 16 of eyewire 15 as screw member 33 is turned. Housing 30 also includes an integrally formed stop 41 which prevents translational movement of screw unit. 33 from sliding or otherwise moving in either lateral direction.

Figure 5:
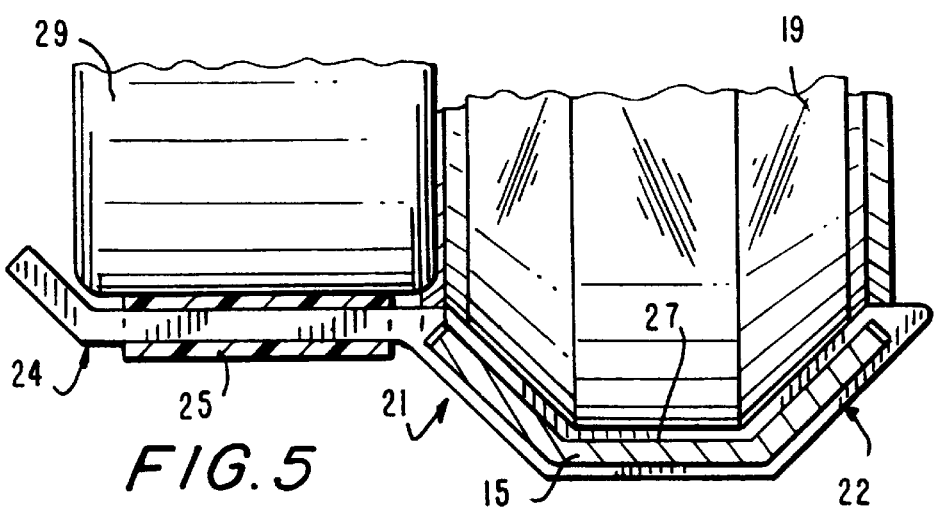
FIG. 5 is a cross-sectional view showing the bottom hook unit of the inventive sunglass clip assembly.

FIG. 5 describes in more detail a first embodiment of each of hook assemblies 21 which are used to maintain overlying engagement of the inventive sunglass clip assembly when placed or worn over a pair of conventional eyeglasses during use. Hook assembly 21 includes a first sunglass hook element generally indicated at 22 and a second eyeglass hook element generally indicated at 24. Hook element 22 includes a slot 27 through which eyewire 15 runs (also see FIG. 2) and is sized for fitting underneath sunglass lens 19.

Eyeglass hook element 24 of hook assembly 21 is formed with a cushion 25 disposed therearound on which an eyeglass frame 29 can sit, as shown in FIG. 5. As can be appreciated from viewing FIG. 5, hook assembly 21 enables the inventive sunglass clip assembly to be aligned with the eyeglass frame of the prescription eyeglasses during use.

Figure 2:
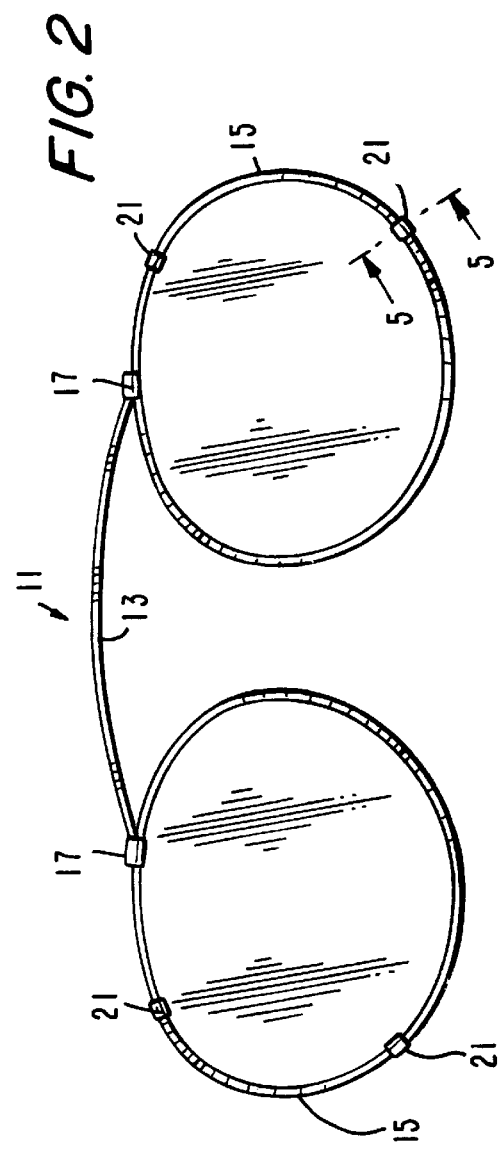
FIG. 2 is a front elevational view of the finished sunglass clip assembly of the invention.

In assembly, an optician first prepares a pair of sunglass lenses 19 identical in size, shape and design to the lenses of a wearer's regular eyeglasses. Then, utilizing clip unit 11 depicted in FIG. 1, each eyewire 15 first fed through slot 27 of hook assembly 21, and then wrapped around lens 19. Then, free ends 16 of each eyewire 15 are fed into passage 40 of corresponding locking unit 17 (see FIG. 4). By turning screw member 33, as described before, threads 39 engage or grab end 16 of eyewire 15 along running grooves 23 in order to lock end 16 into locking unit 17. As a result, a custom sunglass clip assembly as depicted in FIG. 2 is produced.

Figure 7:
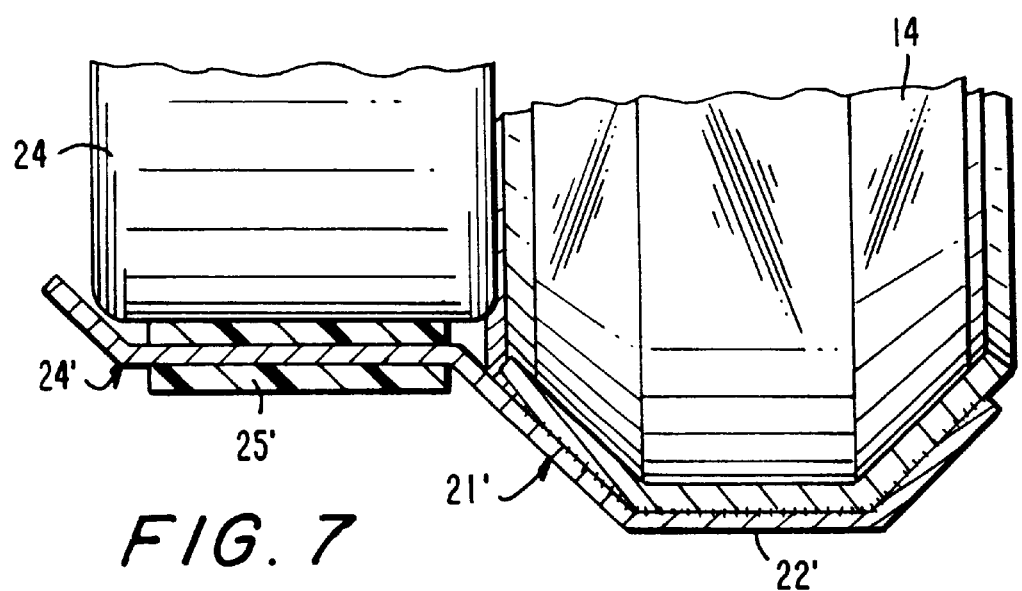
FIG. 7 is a cross-sectional view of an alternative version of the hook unit as depicted in FIG. 6.

FIGS. 6 and 7 describe in more detail an alternative version of the hook assembly, generally indicated at 21'. Hook assembly 21' comprises a first sunglass hook element 22' and a second eyeglass hook element 24'. Hook element 22' is formed integrally and continuous with eyewire 15, as shown in FIG. 6. Hook element 24' is identical to hook element 24 depicted in FIG. 5 and has a cushion 25' disposed thereabout. In this embodiment, a pair of hook assemblies 21' are used. Assembly of the invention is as described above.

As can be appreciated, most often during assembly, there will be excess eyewire. Typically, the excess eyewire is first cut to a length that is sufficient for wrapping around the sunglass lens and locking at its end within its respective locking unit.

It will thus be seen that the objects set forth above, among those made apparent from the preceding description, are efficiently attained, and, since certain changes may be made in the above system and product without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. An eyewear system for producing a customized clip element comprising a tension bar having a first end and a second opposite end, an eyewear lens having a perimeter of any dimension, size or shape and a flexible eyewire adapted for engagingly wrapping completely around the perimeter of said eyewear lens with a length greater than the dimension of said perimeter, said eyewire having a first end attached to said tension bar at one of said tension bar ends and a second end feedable through a locking unit fixed to said tension bar at said one of said tension bar ends such that said locking unit can fixedly grab said eyewire at any location along said eyewire between said first end and said second end with an excess portion of said eyewire including said second end extending past said grabbed location, said excess portion of said eyewire adapted to being cut away.

2. The clip element of claim 1, wherein said tension bar is made of a flexible material.

3. The clip element of claim 1, wherein said flexible eyewire includes a plurality of grooves running therealong.

4. The clip element of claim 3, wherein said locking unit includes a threaded screw for selective engagement with the grooves formed along the second end of said flexible eyewire.

5. The clip element of claim 1, further including a hook member engaged to said eyewire for maintaining said lens in an overlying position with respect to a frame of a conventional pair of glasses.

6. The clip element of claim 5, wherein said member includes a slot through which eyewire runs.

7. The clip element of claim 5, wherein said hook member includes a first hook element for sitting underneath and otherwise engaging said lens, and a second hook element for sitting underneath and otherwise engaging said eyeglass frame.

8. A customized eyewear assembly comprising:

an eyewear lens having a perimeter of any size, shape or dimension, a clip element comprising a tension bar having a first end and a second opposite end and a flexible eyewire adapted for engagingly wrapping completely around said eyewear lens with a length greater than the dimension of the said perimeter, said eyewire having a first end attached to said tension bar at one of said tension bar ends, a second end feedable through a locking unit fixed to said tension bar at said one of said tension bar ends and a plurality of threaded grooves running therealong, wherein said locking unit is designed to physically grab said eyewire by means of engagement with one of said threaded grooves at any location along said eyewire between said first end and second end with an excess portion of said eyewire including said second end extending past said grabbed location and adapted to be cut away.

9. The assembly of claim 8, wherein said locking unit includes a threaded screw for selective engagement with the grooves formed along said flexible eyewire.

10. The assembly of claim 11, further including a hook member engaged to said eyewire for maintaining said lens in an overlying position with respect to a frame of a conventional pair of glasses.

11. The assembly of claim 10, wherein said member includes a slot through which eyewire runs.

12. The assembly of claim 11, further including a hook member engaged to said eyewire for maintaining said lens in an overlying position with respect to a frame of a conventional pair of glasses.

13. The assembly of claim 8, wherein said eyewire comes off one of said tension bar ends.

14. The assembly of claim 8, wherein said eyewire comprises a pair of eyewires having its first ends attached to opposite ends of said tension bar.

15. An method for producing a customized clip element for an eyewear system comprising the steps of:

wrapping a flexible eyewire that is attached at a first end to one end of a tension bar completely around an eyewear lens;

feeding a second end of said flexible eyewire through a locking unit fixed to said tension bar at said one end; and grabbing said eyewire by said locking unit at a location along said eyewire between said first end and said second end such that said eyewire is tightly wrapped completely around said lens.

16. The method of claim 15, wherein any excess portion of said eyewire extending between where said locking unit grabs said eyewire and said second end is cut away.

17. The method of claim 15, wherein said grabbing step comprises engaging a threaded screw with one or more threaded grooves formed along said flexible eyewire.

* * * * *